(12) United States Patent
Yoshizawa et al.

(10) Patent No.: US 10,152,996 B2
(45) Date of Patent: Dec. 11, 2018

(54) PROCESS FOR PRODUCING MAGNETIC RECORDING MEDIUM

(71) Applicant: FUJI ELECTRIC CO., LTD., Kawasaki-shi (JP)

(72) Inventors: Tsuyoshi Yoshizawa, Sendai (JP); Takehito Shimatsu, Sendai (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 0 days.

(21) Appl. No.: 15/115,856

(22) PCT Filed: Jun. 22, 2015

(86) PCT No.: PCT/JP2015/003115
§ 371 (c)(1),
(2) Date: Aug. 1, 2016

(87) PCT Pub. No.: WO2016/024378
PCT Pub. Date: Feb. 18, 2016

(65) Prior Publication Data
US 2017/0169850 A1    Jun. 15, 2017

(30) Foreign Application Priority Data

Aug. 12, 2014  (JP) ................. 2014-164282

(51) Int. Cl.
| | | |
|---|---|---|
| G11B 5/851 | (2006.01) | |
| G11B 5/66 | (2006.01) | |
| G11B 5/65 | (2006.01) | |

(52) U.S. Cl.
CPC ............. *G11B 5/851* (2013.01); *G11B 5/65* (2013.01); *G11B 5/653* (2013.01); *G11B 5/66* (2013.01)

(58) Field of Classification Search
CPC .. G11B 5/84; G11B 5/66; G11B 5/645; G11B 5/851; G11B 5/85; G11B 5/8404; G11B 5/854; C23C 14/027
(Continued)

(56) References Cited

U.S. PATENT DOCUMENTS

| | | |
|---|---|---|
| 8,900,730 B2 | 12/2014 | Bhatia et al. |
| 2004/0184176 A1 | 9/2004 | Shimazaki et al. |

(Continued)

FOREIGN PATENT DOCUMENTS

| | | |
|---|---|---|
| JP | 02-215106 A | 8/1990 |
| JP | 2005-038569 A | 2/2005 |

(Continued)

OTHER PUBLICATIONS

Chen et al.,"FePt—C graded media for ultra-high density magnetic recording," Journal of Physics D: Applied Physics., vol. 43., 2010.
(Continued)

*Primary Examiner* — Tabassom Tadayyon Eslami
(74) *Attorney, Agent, or Firm* — Venable LLP; Michael A. Sartori; Kerri M. Patterson (57) ABSTRACT

The problem of the invention is to provide a process for producing a magnetic recording medium which exhibits both of excellent thermal stability and favorable writing capability. The process for producing the magnetic recording medium of the invention includes the steps of: (A) forming the first magnetic recording layer while monotonously changing a substrate temperature; and (B) forming the second magnetic recording layer while monotonously changing the substrate temperature wherein the material of the second magnetic recording layer is different from the material of the first recording layer, wherein the substrate temperature at the beginning of the step (B) is set such that the magnetic anisotropy constant of the first magnetic
(Continued)

recording layer and the magnetic anisotropy constant of the second magnetic recording layer is changed monotonously at the interface between the first and second magnetic recording layers.

9 Claims, 4 Drawing Sheets

(58) Field of Classification Search
USPC ............... 427/127, 128, 129, 130, 131, 132; 428/310.5
See application file for complete search history.

(56) References Cited

U.S. PATENT DOCUMENTS

| | | | |
|---|---|---|---|
| 2010/0233515 A1* | 9/2010 | Kong | G11B 5/66 428/846 |
| 2012/0052330 A1* | 3/2012 | Takekuma | G11B 5/84 428/829 |
| 2013/0320254 A1 | 12/2013 | Bhatia et al. | |
| 2015/0118521 A1 | 4/2015 | Bhatia et al. | |
| 2015/0213821 A1 | 7/2015 | Ono et al. | |

FOREIGN PATENT DOCUMENTS

| | | |
|---|---|---|
| JP | 2012-048784 A | 3/2012 |
| WO | WO-2012/105908 A1 | 8/2012 |
| WO | WO-2014/087665 A1 | 6/2014 |
| WO | WO-2015/001768 A1 | 1/2015 |

OTHER PUBLICATIONS

Zha et al., "Continuously graded anisotrophy in single $(Fe_{53}PT_{47})_{100-x}CU_x$ films," Appl. Phys. Lett., 2010, vol. 97.

International Search Report in International Application No. PCT/JP2015/003115, dated Sep. 1, 2015.

Written Opinion of the International Searching Authority in International Application No. PCT/JP2015/003115, dated Sep. 1, 2015.

\* cited by examiner

PROCESS FOR PRODUCING MAGNETIC RECORDING MEDIUM

TECHNICAL FIELD

Some of constitutional examples of the present invention relate to a process for producing a magnetic recording medium. In particular, some of constitutional examples of the present invention relate to a process for producing a magnetic recording medium exhibiting both of excellent thermal stability and favorable writing capability.

BACKGROUND ART

Perpendicular magnetic recording system is adopted as a technique for increasing the magnetic recording density. A perpendicular magnetic recording medium at least comprises a non-magnetic substrate, and a magnetic recording layer formed of a hard-magnetic material. Optionally, the perpendicular magnetic recording medium may further comprise: a soft-magnetic under layer playing a role in concentrating the magnetic flux generated by a magnetic head onto the magnetic recording layer; an interlayer for orienting the hard-magnetic material in the magnetic recording layer in an intended direction; a protective film for protecting the surface of the magnetic recording layer; and the like.

Hitherto, magnetic layers formed of CoCr-based unordered alloys such as CoCrPt have been investigated as a metallic magnetic material for the perpendicular magnetic recording medium. For the purpose of further increasing the recording density of the perpendicular magnetic recording medium, an urgent need for reduction in the grain diameter of the magnetic crystal grains in the magnetic layer arises in recent years. On the other hand, reduction in the grain diameter of the magnetic crystal grains leads to a decrease in thermal stability of the recorded magnetization (also referred to as recorded signals). Thus, the magnetic crystal grains in the magnetic layer need to be formed of materials with higher magnetocrystalline anisotropies, in order to compensate the decrease in thermal stability due to the reduction in the grain diameter of the magnetic crystal grains.

$L1_0$ type ordered alloys as the materials having the required higher magnetocrystalline anisotropies and production method thereof have been proposed. The $L1_0$ type ordered alloys include FePt, CoPt, FePd, CoPd, and the like. It is necessary to increase the degree of order by pre-heating or post-heating, when the $L1_0$ type ordered alloys are used. Japanese Patent Laid-Open No. 2012-48784 proposes a method for producing a perpendicular magnetic recording medium having a magnetic recording layer of a desired thickness, by repeating the steps of heating a substrate and depositing a film of the $L1_0$ type ordered alloy having a small thickness, in order to prevent reduction in the degree of order of the $L1_0$ type ordered alloy due to a drop in the substrate temperature (see PTL1).

On the other hand, reduction in the sizes of the magnetic crystal grains means reduction in the cross-sectional areas of the crystal magnetic grains having a certain height, since the thickness of the magnetic recording layer is basically uniform in in-plane directions of the magnetic recording medium. Therefore, a diamagnetic field acting on the magnetic crystal grains themselves decreases, whereas a magnetic field required for switching the magnetization of the magnetic crystal grains (magnetic switching field) increases. As described above, the improvement of the recording density implies that a larger magnetic field is required for writing a magnetization (or, recording signals), in view of the shape of the magnetic crystal grains. In other words, a problem of deterioration of the writing capability of the magnetic recording medium becomes apparent, as the recording density increases.

Chen et al. proposes a magnetic recording medium having a graded magnetic recording layer consisting of a bottom layer having a large magnetic anisotropy constant (Ku), a middle layer having an intermediate Ku, and a top layer having a low Ku in this order, as a trial to improve writing capability of the magnetic recording medium while maintaining the thermal stability of the recorded signals (see NPL1). Here, the bottom layer, the middle layer and the top layer have a granular structure consisting of $L1_0$ type FePt ordered alloy and a C grain boundary. Further, the Ku's of the respective layers are controlled by adjusting the degree of order of the $L1_0$ type FePt ordered alloy by changing the temperatures when forming the bottom, middle and top layers. Chen et al. reports that the coercive force of the above-described three layer construction decreases to 5.9 kOe (about 470 A/mm), whereas the sole high Ku layer has a coercive force of 11.4 kOe (about 907 A/mm).

Besides, Zha et al. proposes a graded magnetic layer having a magnetic recording layer consisting of $(FePt)_{100-x}Cu_x$ alloy wherein x, the content of Cu, monotonously decreases from 30 at the bottom to 0 at the top (see NPL2). Zha et al. reports that the graded magnetic layer consisting of $(FePt)_{100-x}Cu_x$ alloy (x being monotonously decrease from 30 to 0) exhibits a coercive force of 5.67 kOe (about 451 A/mm), whereas a magnetic layer consisting of $(Fe_{53}Pt_{47})_{85}Cu_{15}$ alloy and having uniform composition exhibits 7.21 kOe (about 574 A/mm).

Further, International Patent Publication No. WO 2012/105908 discloses ion implantation into a magnetic recording medium, and thereby forming a graded magnetic recording layer wherein the peak of amount of the implanted ions is at the top of the magnetic recording layer, and the amount of the implanted ions decreases in the depth direction in a graded manner. Here, the implanting ion is selected from the group consisting of $He^+$, $C^+$, $N^{2+}$, $Ar^+$, $Co^+$, and $Sb^+$.

CITATION LIST

Patent Literature

PTL1: Japanese Patent Laid-Open No. 2012-48784
PTL2: International Patent Publication No. WO2012/105908

Non Patent Literature

NPL1: Chen et al., J. Phys. D: Appl. Phys., Vol. 43 (2010),
NPL2: Zha et al., Appl. Phys. Lett., 97, 182504 (2010)

SUMMARY OF INVENTION

Technical Problem

There is a need for a method for producing a magnetic recording medium comprising a magnetic recording layer having excellent thermal stability and favorable writing capability.

Solution to Problem

One embodiment of processes for producing magnetic recording media is a process for producing a magnetic recording medium comprising a non-magnetic substrate, a first magnetic recording layer comprising an ordered alloy, and a second magnetic recording layer comprising an ordered alloy, the process comprising the steps of:

(A) forming the first magnetic recording layer while monotonously changing a substrate temperature; and (B) forming the second magnetic recording layer while monotonously changing the substrate temperature wherein the material of the second magnetic recording layer is different from the material of the first recording layer, wherein the substrate temperature at the beginning of the step (B) is set such that the magnetic anisotropy constants of the first magnetic recording layer and the magnetic anisotropy constant of the second magnetic recording layer is changed monotonously at the interface between the first and second magnetic recording layers. Here, it is preferable that the first magnetic recording layer comprises a binary ordered alloy consisting of Fe and Pt, and the second magnetic recording layer comprises a ternary-or-higher ordered alloy consisting of Fe, Pt, and one or more additional elements.

Besides, it is preferable that the substrate temperature decreases monotonously during the step (A). The substrate temperature at the end of the step (A) may be set to a temperature not less than the highest temperature of a temperature range in which the phase transition between unordered and ordered phases of the binary ordered alloy occurs, or more preferably a temperature higher by 20° C. or more than the above-described highest temperature of the temperature range in which the phase transition between unordered and ordered phases of the binary ordered alloy occurs.

Further, it is desirable that the substrate temperature decreases monotonously during the step (B).

Besides, when the step (A) is carried out prior to the step (B), it is preferable to set the substrate temperature at the beginning of the step (B) such that a difference between the magnetic anisotropy constant of the first magnetic recording layer and the magnetic anisotropy constant of the second magnetic recording layer is within the range of ±3% at the interface between the first and second magnetic recording layers.

Further, each of the first and second magnetic recording layers may further comprise a non-magnetic grain boundary material. The useful non-magnetic grain boundary material may comprise at least one material selected from the group consisting of C, B, Ag, Ge, W, $SiO_2$, $Al_2O_3$, $TiO_2$, $GeO_2$ and $B_2O_3$.

Advantageous Effects of Invention

By adopting the above-described configuration, it becomes possible to produce a magnetic recording layer exhibiting excellent thermal stability and favorable writing capability and a magnetic recording medium comprising the above-described magnetic recording layer, in a simple manner.

DESCRIPTION OF EMBODIMENTS

A constitutional example of magnetic recording media produced by the process described below in detail comprises a non-magnetic substrate and a magnetic recording layer, and the magnetic recording layer consists of a first magnetic recording layer and a second magnetic recording layer. Each of the first and second magnetic recording layer comprises an ordered alloy. Further, the first and second magnetic recording layers comprise different material from each other.

Figure 1:
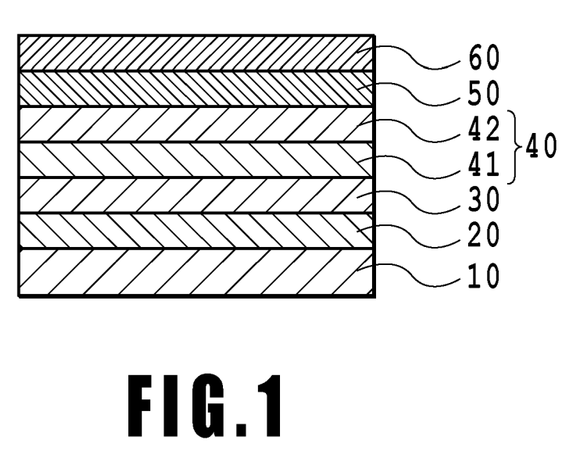
FIG. 1 is a schematic cross-sectional diagram showing a configuration example of the magnetic recording medium obtained by the present process.

Preferably, the first magnetic recording layer comprises a binary ordered alloy consisting of Fe and Pt, and the second magnetic recording layer comprises a ternary-or-higher ordered alloy consisting of Fe, Pt, and one or more additional elements. A constitutional example of the magnetic recording media is shown in FIG. 1. In the constitutional example shown in FIG. 1, the magnetic recording medium comprises non-magnetic substrate 10, soft-magnetic under layer 20, seed layer 30, magnetic recording layer 40, protective layer 50, and liquid lubricant layer 60, wherein the magnetic recording layer 40 consists of first magnetic recording layer 41 and second magnetic recording layer 42. Here, the soft-magnetic under layer 20, the seed layer 30, the protective layer 50, and the liquid lubricant layer 60 are optional constituent layers which may be provided as the need arises. The magnetic recording medium produced by the present process may further comprise an adhesive layer, an intermediate layer and the like, between the non-magnetic substrate 10 and the magnetic recording layer 40.

The non-magnetic substrate 10 may be various substrates having a flat surface. For example, the non-magnetic substrate 10 may be formed of material commonly used in magnetic recording media. The material of the non-magnetic substrate comprises a NiP-plated Al alloy, tempered glass, crystallized glass, and the like.

The soft-magnetic under layer 20, which may be formed optionally, controls the magnetic flux emitted from a magnetic head to improve the read-write characteristics of the magnetic recording medium. The material for forming the soft-magnetic under layer 20 includes: a crystalline material such as a NiFe alloy, a sendust (FeSiAl) alloy, or a CoFe alloy; a microcrystalline material such as FeTaC, CoFeNi or CoNiP; and an amorphous material including a Co alloy such as CoZrNb or CoTaZr. The optimum thickness of the soft-magnetic under layer 20 depends on the structure and characteristics of the magnetic head used in magnetic recording. When forming the soft-magnetic under layer 20 continuously with other layers, the soft-magnetic under layer 20 preferably has a thickness in a range from 10 nm to 500 nm (both inclusive), in view of productivity.

The adhesive layer (not shown), which may be formed optionally, is used for enhancing the adhesion between the layer formed on it and the layer formed under it (including the non-magnetic substrate 10). If the adhesive layer is disposed on the upper surface of the non-magnetic substrate 10, the adhesive layer can be formed of a material having good adhesion to the material of the non-magnetic substrate 10. Such material includes CrTi alloys and the like. Alternatively, when the adhesive layer is formed between two constituent layers other than the non-magnetic substrate 10, the material for forming the adhesive layer comprises a metal such as Ni, W, Ta, Cr or Ru, or an alloy containing the above-described metals. The adhesive layer may be a single layer or have a stacked structure with plural layers.

The seed layer 30 has a function to control the grain diameter and the crystalline orientation of the magnetic crystal grains in the magnetic recording layer 40 which is an upper layer of the seed layer 30. The seed layer 30 may have a function to ensure the adhesion between the magnetic recording layer 40 and the layer lying below the seed layer 30. Further, other layers such as intermediate layer and the like may be disposed between the seed layer 30 and the magnetic recording layer 40. When disposing the intermediate layer or the like, the seed layer 30 plays a role to control the grain diameter and the crystalline orientation of the magnetic crystal grains in the magnetic recording layer 40, by controlling the grain diameter and the crystalline orientation of the crystal grains in the intermediate layer and the like. The seed layer 30 is preferably non-magnetic. The material of the seed layer 30 may be appropriately selected in accordance with the material of the magnetic recording layer 40. For example, if the magnetic crystal grains in the magnetic recording layer 40 are formed of an $L1_0$ type ordered alloy, it is preferable to form the seed layer 30 of an NaCl-type compound. Particularly preferably, the seed layer 30 is formed of oxides such as MgO or $SrTiO_3$, or nitrides such as SiN. In addition, the seed layer 30 can be formed by stacking a plurality of layers. When the seed layer 30 consists of a plurality of layers, layers selected from the above-described layers may be stacked over underlying layers consisting a metal such as Ta and Cr. The seed layer 30 preferably has a thickness from 1 nm to 60 nm, more preferably from 1 nm to 20 nm, in view of improvement in crystallinity of the magnetic crystal grains in the magnetic recording layer 40, and improvement in productivity. The seed layer 30 can be formed by any process known in the art, such as a sputtering method (including an RF magnetron sputtering method and a DC magnetron sputtering method) or a vacuum deposition method.

The intermediate layer (not shown) is a layer disposed for improving the crystalline orientation of the magnetic recording layer 40 and improving the size or the like of the magnetic crystal grains. The intermediate layer may have a function to take over the crystalline structure from the layer formed under the intermediate layer so as to transfer the structure to the magnetic recording layer 40. Further, when the soft-magnetic under layer 20 is deposited, the intermediate layer may have a function to prevent the soft-magnetic under layer 20 from magnetically influencing the magnetic recording layer 40. The intermediate layer is preferably non-magnetic. The material for forming the intermediate layer includes a metal such as Cr or Ta, a NiW alloy, and Cr-based alloys such as CrTi, CrZr, CrTa, or CrW. The intermediate layer can be formed by any process known in the art, such as a sputtering method.

The protective layer 50 can be formed of a material conventionally used in the field of magnetic recording media. Specifically, the protective layer 50 can be formed of a carbon-based material such as diamond-like carbon, or silicon-based material such as silicon nitride. The protective layer 50 may be a single layer or have a stacked structure. The stacked structure of the protective layer 50 may be a stacked structure of two types of carbon-based material having different characteristics from each other, a stacked structure of metal and a carbon-based material, or a stacked structure of metallic oxide film and a carbon-based material, for example. The protective layer 50 can be formed by any process known in the art such as a CVD method, a sputtering method (including a DC magnetron sputtering method) or a vacuum deposition method.

Optionally, the magnetic recording medium may further comprise the liquid lubricant layer 60 disposed on the protective layer 50. The liquid lubricant layer 60 can be formed of a material conventionally used in the field of magnetic recording media. The material of the liquid lubricant layer 60 includes perfluoropolyether-based lubricants or the like, for example. The liquid lubricant layer 60 can be formed by a coating method such as a dip-coating method, a spin-coating method, or the like, for example.

The magnetic recording layer 40 consists of the first magnetic recording layer 41 comprising an ordered alloy, and the second magnetic recording layer 42 comprising an ordered alloy. The first magnetic recording layer 41 and the second magnetic recording layer 42 are formed of different material from each other. The magnetic anisotropy constant Ku of the magnetic recording material varies in accordance with the type of material. Therefore, the range of variation of the magnetic anisotropy constant Ku as the whole of the magnetic recording layer can increases, by using the different materials for forming the first magnetic recording layer 41 and the second magnetic recording layer 42. For example, by constituting the magnetic recording layer 40 of the first magnetic recording layer 41 comprising a binary ordered alloy consisting of Fe and Pt, and the second magnetic recording layer 42 comprising a ternary-or-higher ordered alloy consisting of Fe, Pt, and one or more additional elements, the range of variation of the magnetic anisotropy constant Ku can be increased in comparison with a magnetic recording layer formed of a single material. The material of the first magnetic recording layer 41 and the second magnetic recording layer 42 can be arbitrarily selected, as long as the range of variation of the magnetic anisotropy constant Ku can increases. For example, when the first magnetic recording layer 41 and the second magnetic recording layer 42 are formed of the ternary-or-higher ordered alloy consisting of Fe, Pt, and one or more additional elements, it is possible to differentiate the materials of the first magnetic recording layer 41 and the second magnetic recording layer 42 from each other, by using the same additional element but changing the ratio of the additional element. The first magnetic recording layer 41 may be formed of the ternary-or-higher ordered alloy, and the second magnetic recording layer 42 may be formed of the binary ordered alloy. The first magnetic recording layer 41 is a layer closer to the non-magnetic substrate 10, and the second magnetic recording layer 42 is formed on the first magnetic recording layer 41.

Hereinafter, the case where the first magnetic recording layer 41 is formed of the binary ordered alloy and the second magnetic recording layer 42 is formed of the ternary-or-higher ordered alloy, for ensuring conciseness of the explanation.

The first magnetic recording layer 41 may consist of the binary ordered alloy only, or may have a granular structure which consists of magnetic crystal grains consisting of the binary ordered alloy and a non-magnetic grain boundary. Similarly, the second magnetic recording layer 42 may consist of the ternary-or-higher ordered alloy only, or may have a granular structure which consists of magnetic crystal grains consisting of the ternary-or-higher ordered alloy and a non-magnetic grain boundary.

The binary ordered alloy in the first magnetic recording layer 41 is preferably an $L1_0$ type FePt ordered alloy. The ternary-or-higher ordered alloy in the second magnetic recording layer 42 preferably consists of Fe, Pt and one or more additional elements. Particularly preferably, the ternary-or-higher ordered alloy is an $L1_0$ type ordered alloy. The additional element comprises non-magnetic elements such as Cu, Mn, Ni, Ag and Ti. Preferable ternary-or-higher ordered alloy comprises FePtCu, FePtMn, FePtNi, FePtAgTi, and the like. Preferable contents of these additional elements is approximately from 10 to 20 at %.

When the first magnetic recording layer 41 and/or the second magnetic recording layer 42 have a granular structure, the material of the non-magnetic grain boundary comprises at least one element selected from the group consisting of C, B, Ag, Ge and W, and an oxide selected from the group consisting of $SiO_2$, $Al_2O_3$, $TiO_2$, $GeO_2$, and $B_2O_3$.

The first magnetic recording layer 41 and the second magnetic recording layer 42 can be formed by a sputtering method. When forming the first magnetic recording layer 41, it is preferable to use a target comprising Fe and Pt at a predetermined ratio. When forming the first magnetic recording layer 41 having the granular structure, it is possible to use a target comprising Fe, Pt and the material of the non-magnetic grain boundary at a predetermined ratio.

When forming the second magnetic recording layer 42, it is preferable to use a target comprising Fe, Pt and the additional element at a predetermined ratio. When forming the second magnetic recording layer 42 having the granular structure, the material of the non-magnetic grain boundary at a predetermined ratio is added to the target comprising Fe, Pt and the additional element.

Each of the first magnetic recording layer 41 and the second magnetic recording layer 42 has one directional magnetic anisotropy in a direction perpendicular to the surface of the layer. The magnetic recording layer 40 has a distribution of the magnetic anisotropy constant Ku which monotonously changes from the outer surface of the first magnetic recording layer 41 to the outer surface of the second magnetic recording layer 42. In the present specification, the phrase "outer surface" of the first magnetic recording layer 41 and the second magnetic recording layer 42 means a surface on the reverse side of the interface between the first magnetic recording layer 41 and the second magnetic recording layer 42, for each layer. Preferably, the magnetic recording layer 40 has a distribution of the magnetic anisotropy constant Ku which continuously changes from the outer surface of the first magnetic recording layer 41 to the outer surface of the second magnetic recording layer 42. In the present specification, the phrase "monotonous change" means that the value of a given property always increases or decreases in the thickness direction. The monotonous change permits the presence of discontinuity of the value of the property. In the present specification the phrase "continuous change" means monotonous change in which no discontinuity exists.

The distribution of the magnetic anisotropy constant Ku in the first magnetic recording layer 41 can be obtained by monotonously changing the substrate temperature, thereby monotonously changing the degree of order of the binary ordered alloy. By monotonously increasing the substrate temperature during formation thereby monotonously increasing the degree of order of the binary ordered alloy, Ku may increase from the bottom surface to the top surface of the first magnetic recording layer 41. Alternatively, Ku may decrease from the bottom surface to the top surface of the first magnetic recording layer 41 by monotonously decreasing the substrate temperature during formation thereby monotonously decreasing the degree of order of the binary ordered alloy. It is preferable that the change in the substrate temperature during formation is continuous. In the present specification, the phrase "substrate temperature" means a temperature of the surface onto which a material is deposited in the concerned step to form an intended layer. Each of the first magnetic recording layer 41 and the second magnetic recording layer 42 is formed on the stacked body in which other layers are stacked on the non-magnetic substrate. Thus, the temperature directly influencing the formation of the first magnetic recording layer 41 and the second magnetic recording layer 42 is the temperature of the topmost surface of the stacked body.

The distribution of the magnetic anisotropy constant Ku in the second magnetic recording layer 42 can be obtained by monotonously changing the substrate temperature, thereby monotonously changing the degree of order of the ternary-or-higher ordered alloy. By monotonously increasing the substrate temperature during formation, thereby monotonously increasing the degree of order of the ternary-or-higher ordered alloy, Ku may increase from the bottom surface to the top surface of the second magnetic recording layer 42. Alternatively, Ku may decrease from the bottom surface to the top surface of the second magnetic recording layer 42 by monotonously decreasing the substrate temperature during formation, thereby monotonously decreasing the degree of order of the binary ordered alloy. It is preferable that the change in the substrate temperature during formation is continuous.

The highest temperature during formation of the first magnetic recording layer 41 is desirably set to a temperature to the extent that the degree of $L1_0$ order of the FePt alloy becomes sufficiently high, but the grain size does not increase. More preferably, the highest temperature is approximately from 450° C. to 500° C., and the magnetic anisotropy constant Ku obtained in such temperature range is approximately from $2.5 \times 10^7$ to $3 \times 10^7$ erg/cm$^3$ (2.5 to 3 J/cm$^3$).

It is desirable that the lowest temperature during formation of the first magnetic recording layer 41 is not less than the highest temperature of the temperature range where transition between unordered and ordered phases of the binary alloy occurs. More preferably, the lowest temperature during formation of the first magnetic recording layer 41 can be higher by not less than 20° C. than the highest temperature of the temperature range in which the transition between unordered and ordered phases of the binary alloy occurs. It is desirable that the lowest temperature during formation of the first magnetic recording layer 41 is set to a temperature where the magnetic anisotropy constant Ku becomes approximately 50% of the value obtainable at the highest temperature during formation of the first magnetic recording layer 41. More preferably, the lowest temperature during formation of the first magnetic recording layer 41 is approximately from 350° C. to 380° C.

Besides, it is desirable that the lowest temperature during formation of the second magnetic recording layer 42 is not less than the highest temperature of the temperature range where transition between unordered and ordered phases of the ternary-or-higher alloy occurs. More preferably, the lowest temperature during formation of the second magnetic recording layer 42 can be higher by not less than 20° C. than the highest temperature of the temperature range in which the transition between unordered and ordered phases of the ternary-or-higher alloy occurs. For example, if the ternary-or-higher alloy is $Fe_{42.5}Pt_{42.5}Cu_{15}$, the desirable lowest temperature is approximately from 270° C. to 300° C., and the magnetic anisotropy constant Ku obtained in such temperature range is approximately from $1.5 \times 10^6$ to $2.5 \times 10^6$ erg/cm$^3$ (0.15 to 0.25 J/cm$^3$).

The substrate temperature at the beginning of formation of the second magnetic recording layer 42 is set such that the value of the magnetic anisotropy constant Ku varies monotonously at the interface with the first magnetic recording layer 41. For example, when the first magnetic recording layer 41 is formed such that Ku decreases from the bottom surface to the top surface, the substrate temperature at the beginning of formation of the second magnetic recording layer 42 is set such that Ku of the second magnetic recording layer 42 is smaller than Ku of the first magnetic recording layer 41 at topmost surface thereof. When the first magnetic recording layer 41 is formed such that Ku increases from the bottom surface to the top surface, the substrate temperature at the beginning of formation of the second magnetic recording layer 42 is set such that Ku of the second magnetic recording layer 42 is larger than Ku of the first magnetic recording layer 41 at topmost surface thereof. It is desirable that the substrate temperature is desirably set such that the change in Ku is continuous at the interface of the first magnetic recording layer 41 and the second magnetic recording layer 42. Here, if the difference in the magnetic anisotropy constant Ku at the interface is within the range of ±3%, the change in Ku is considered as continuous.

When the second magnetic recording layer 42 is formed while decreasing Ku, the substrate temperature at the beginning of the formation is the highest temperature. The concrete range of the highest temperature is from 430° C. to 470° C., when the ternary alloy of the second magnetic recording layer 42 is $Fe_{42.5}Pt_{42.5}Cu_{15}$, for example. Thereby, the value of the magnetic anisotropy constant Ku at the vicinity of the interface of the second magnetic recording layer 42 can be set within a range from $1.2 \times 10^7$ to $1.5 \times 10^7$ erg/cm$^3$ (1.2 to 1.5 J/cm$^3$).

By the way, the highest and lowest temperatures during formation of the first magnetic recording layer 41 are the substrate temperatures at the beginning and the end of formation of the first magnetic recording layer 41, respectively, when the substrate temperature decreases monotonously. The highest and lowest temperatures during formation of the first magnetic recording layer 41 are the substrate temperatures at the end and the beginning of formation of the first magnetic recording layer 41, respectively, when the substrate temperature increases monotonously.

Similarly, the highest and lowest temperatures during formation of the second magnetic recording layer 42 are the substrate temperatures at the beginning and the end of formation of the second magnetic recording layer 42, respectively, when the substrate temperature decreases monotonously. The highest and lowest temperatures during formation of the second magnetic recording layer 42 are the substrate temperatures at the end and the beginning of formation of the second magnetic recording layer 42, respectively, when the substrate temperature increases monotonously.

Continuous distribution of the magnetic anisotropy constant Ku can be achieved by monotonously decreasing the substrate temperature during formation of the first magnetic recording layer 41, and monotonously decreasing the substrate temperature during formation of the second magnetic recording layer 42.

In the preferable magnetic recording media obtained by the above-described process, the distribution of Ku is controlled by the substrate temperature during formation, when forming the first magnetic recording layer 41 comprising the binary ordered alloy which has relatively high Ku. There is a problem that the Ku cannot be controlled appropriately if it is intended to achieve broader change in Ku by the control of the substrate temperature. For example, in the case of the binary ordered alloy consisting of FePt, sudden transition between the $L1_0$ ordered phase and the A1 unordered phase occurs in a temperature range from 300° C. to 350° C. Therefore, appropriate control of Ku is difficult in a region where Ku is relatively low. In the above described process, the need to decrease the substrate temperature during formation of the first magnetic recording layer to the temperature at which the transition between the unordered and ordered phases occurs (for example, 350° C. for FePt) is excluded by combining the second magnetic recording layer 42, and thereby it becomes possible to favorably control the distribution of Ku in the first magnetic recording layer 41.

On the other hand, in the preferable magnetic recording media obtained by the above-described process, the distribution of Ku is controlled by the substrate temperature during formation, when forming the second magnetic recording layer 42 comprising the ternary-or-higher ordered alloy which has relatively low Ku.

For the distribution of the magnetic anisotropy constant Ku in the second magnetic recording layer 42, the variation in the distribution can be increased by controlling the additional element. That is, variation in Ku can be increased by monotonously changing the sputtering power for the additional element during formation to monotonously change the deposition rate of the additional element. By monotonously increasing the sputtering power for the additional element during formation to monotonously increase the deposition rate of the additional element, Ku may be decreased from the bottom surface to the top surface of the second magnetic recording layer 42. Alternatively, Ku may be increased from the bottom surface to the top surface of the second magnetic recording layer 42, by monotonously decreasing the sputtering power for the additional element during formation to monotonously decrease the deposition rate of the additional element. It is preferable to continuously change the sputtering power of the additional element during formation.

The following problem may arise if it is intended to change Ku only by the control of the additional element. Particularly, there is a problem that decrease in saturated magnetization (Ms) becomes significant, in a region where the content of the additional element added to the ordered alloy exceeds a certain amount. Therefore, uniformity of Ms may be deteriorated when a broad distribution of Ku is obtained by controlling the deposition rate of the additional element. Uniformity of Ms is ensured in this embodiment, since combining the first magnetic recording layer 41 and controlling the substrate temperature during formation of the second magnetic recording layer 42 make it possible to limit the deposition rate of the additional element in the second magnetic recording layer 42 to a narrow range which is lower than the above-described certain amount.

By the way, if the additional element such as Cu and Mn is added to an FePt alloy, transition from the A1 unordered phase to the $L1_0$ ordered phase occurs at a temperature of approximately 250° C. However, the transition is slower in comparison with FePt.

As a result, Ku in the thickness direction can be changed continuously over the broad range which is unachievable solely by the first magnetic recording layer 41 or the second magnetic recording layer 42, and, the uniformity of Ms in the first magnetic recording layer 41 and the second magnetic recording layer 42 can be ensured at the same time.

Thus obtained magnetic recording layer 40 exhibits excellent writing capability due to sufficient decrease in the coercive force, and excellent thermal stability of the recorded signals when the recording density increases, at the same time.

EXAMPLES

Example 1

A chemically strengthened glass substrate having a flat surface (N-10 glass substrate manufactured by HOYA CORPORATION) was washed to prepare non-magnetic substrate 10. The washed non-magnetic substrate 10 was brought into a sputtering device.

Then, soft-magnetic under layer 20 was formed by a DC magnetron sputtering method using an NiFe target in Ar gas at a pressure of 0.67 Pa.

Next, seed layer 30 having a two-layered structure consisting of a Ta layer and an MgO layer was formed. Particularly, the Ta layer having a thickness of 10 nm was formed by a DC magnetron sputtering method using a Ta target in Ar gas at a pressure of 0.67 Pa. Then, onto the stacked body in which the Ta layer had been formed was formed the MgO layer having a thickness of 5 nm by an RF sputtering method using an MgO target in Ar gas at a pressure of 0.06 Pa, to obtain the seed layer 30. By the way, the temperature of the stacked body was monitored by a non-contacting temperature sensor disposed in the chamber.

Figure 2:
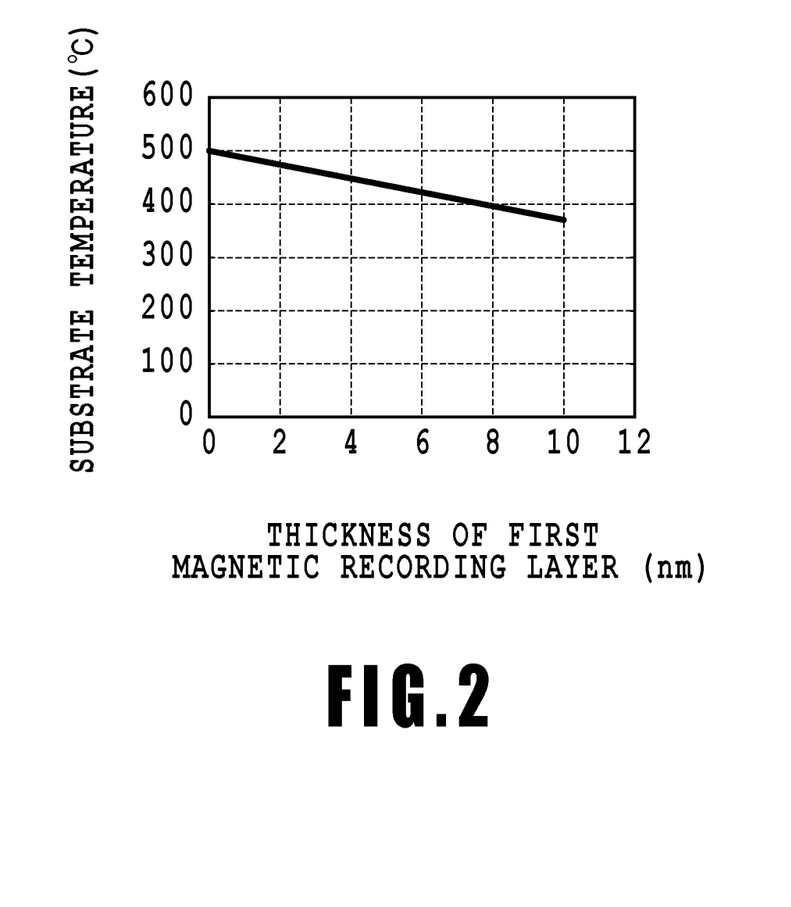
FIG. 2 is a graphical representation showing a profile of a substrate temperature when forming the first magnetic recording layer in Example 1.

Then, the stacked body in which the seed layer 30 had been formed was heated to a temperature of 500° C. Then, first magnetic recording layer 41 consisting of $Fe_{50}Pt_{50}$—$SiO_2$ and having a thickness of 10 nm was formed using a $Fe_{50}Pt_{50}$—$SiO_2$ target in which 80% by volume of $Fe_{50}Pt_{50}$ and 20% by volume of $SiO_2$ are mixed together. Here, the thickness of the deposited layer was monitored by a sensor for measuring film thickness which was disposed in the chamber of the sputtering device. In addition, the substrate temperature was decreased continuously to the thickness as shown in FIG. 2, to set the final substrate temperature to 370° C.

Figure 3:
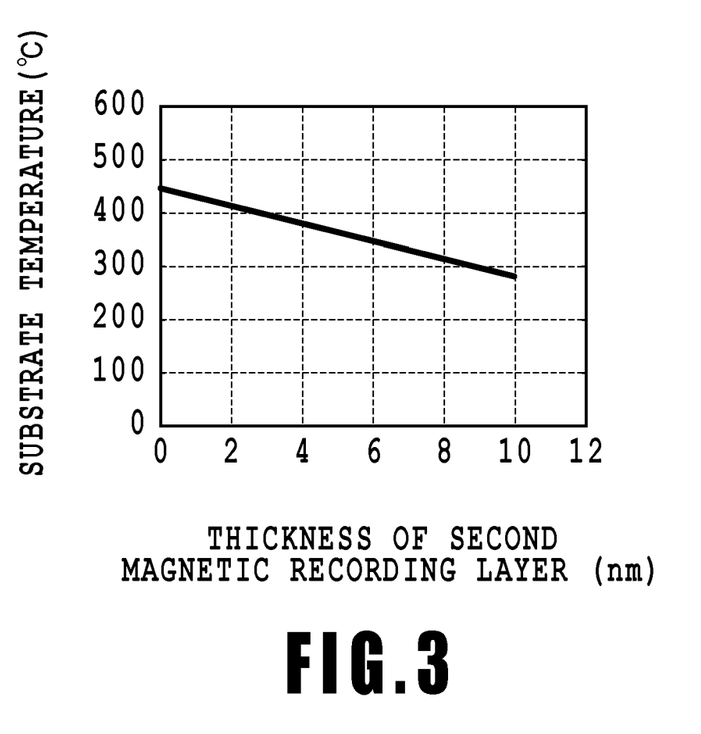
FIG. 3 is a graphical representation showing a profile of a substrate temperature when forming the second magnetic recording layer in Example 1.

Then, the stacked body in which the first magnetic recording layer 41 had been formed was heated to a temperature of 450° C. Then, second magnetic recording layer 42 consisting of $Fe_{43}Pt_{43}Cu_{14}$—$SiO_2$ and having a thickness of 10 nm was formed using a $Fe_{43}Pt_{43}Cu_{14}$—$SiO_2$ target in which 80% by volume of $Fe_{43}Pt_{43}Cu_{14}$ and 20% by volume of $SiO_2$ are mixed together, to obtain magnetic recording layer 40. Here, the thickness of the deposited layer was monitored by the sensor for measuring film thickness which was disposed in the chamber of the sputtering device. In addition, the substrate temperature was decreased continuously to the thickness as shown in FIG. 3, to set the final substrate temperature to 280° C.

Next, protective layer 50 consisting of carbon and having a thickness of 2 nm was formed by a DC magnetron sputtering method using a carbon target in Ar gas. After formation of the protective layer 50, the stacked body was removed from the sputtering device. Finally, liquid lubricant layer 60 having a thickness of 2 nm was formed by applying perfluoropolyether by a dip-coat method, to obtain a magnetic recording medium shown in FIG. 1.

Comparative Example 1

Figure 4:
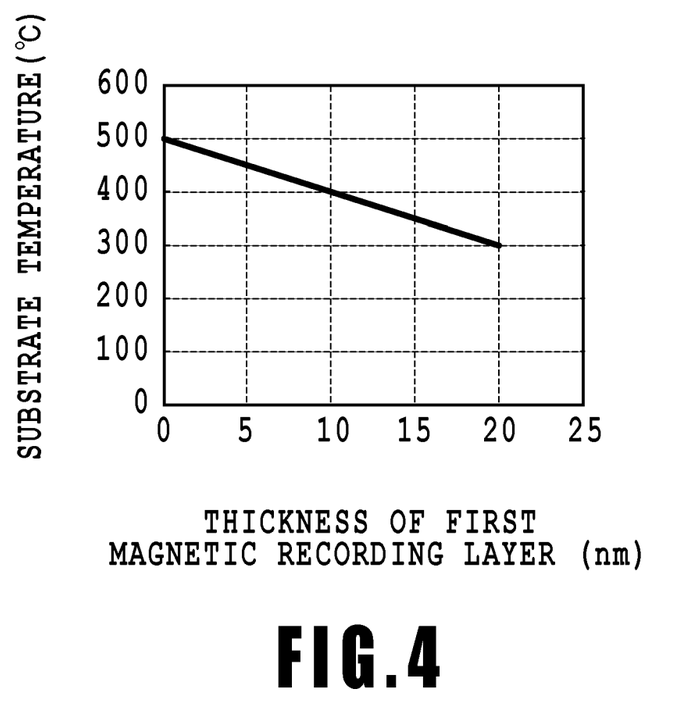
FIG. 4 is a graphical representation showing a profile of a substrate temperature when forming the first magnetic recording layer in Comparative Example 1.

A magnetic recording medium having a magnetic recording layer of a single-layered structure was obtained by repeating the procedure of Example 1, except that the second magnetic recording layer 42 ($Fe_{43}Pt_{43}Cu_{14}$—$SiO_2$ layer) was not formed, the thickness of the first magnetic recording layer 41 ($Fe_{50}Pt_{50}$—$SiO_2$ layer) was changed to 20 nm, and the temperature during formation of the first magnetic recording layer 41 was continuously changed from 500° C. to 300° C. as shown in FIG. 4.

Comparative Example 2

A magnetic recording medium having a magnetic recording layer of a single-layered structure was obtained by repeating the procedure of Example 1, except that the second magnetic recording layer 42 ($Fe_{43}Pt_{43}Cu_{14}$—$SiO_2$ layer) was not formed, the thickness of the first magnetic recording layer 41 ($Fe_{50}Pt_{50}$—$SiO_2$ layer) was changed to 20 nm, and the temperature during formation of the first magnetic recording layer 41 was fixed to 500° C.

Comparative Example 3

A magnetic recording medium having a magnetic recording layer of a two-layered structure was obtained by repeating the procedure of Example 1, except that the temperatures during formation of the first magnetic recording layer 41 and the second magnetic recording layer 42 were fixed to 500° C. and 450° C., respectively.

(Evaluation)

For each of the magnetic recording media produced in Example 1 and Comparative Examples 1 to 3, magnetization curves were measured with a vibrating sample magnetometer (VSM) to obtain a coercive force Hc. Further, thermal stability index $\beta(=\Delta E/k_b T$, wherein $\Delta E$ is an energy barrier, $k_b$ is Boltzmann constant, and T is an absolute temperature) at an absolute temperature of 300° K was obtained by measuring dynamic coercive force of the respective magnetic recording media at plural time scales, and fitting the obtained results to Sharrock's formula. The conditions for forming the magnetic recording layer, Hc and $\beta$ of the respective magnetic recording media are shown in Table 1.

TABLE 1

Conditions for producing the magnetic recording layer, and Properties of the magnetic recording medium

| | Magnetic recording layer | | | | | |
|---|---|---|---|---|---|---|
| | First Magnetic recording layer $Fe_{50}Pt_{50}$—$SiO_2$ | | Second magnetic recording layer $Fe_{43}Pt_{43}Cu_{14}$—$SiO_2$ | | | |
| | thickness (nm) | formation temperature (° C.) | thickness (nm) | formation temperature (° C.) | Hc*[1] | β*[2] |
| Ex. 1 | 10 | 500->370 | 10 | 450->280 | 7.8 (622) | 167 |
| C. Ex. 1 | 20 | 500->300 | — | — | 8.7 (692) | 162 |
| C. Ex. 2 | 20 | 500 | — | — | 15.3 (1220) | 195 |
| C. Ex. 3 | 10 | 500 | 10 | 450 | 11.6 (923) | 179 |

*[1] The value is represented in kOe, and the converted value in parenthesis is represented in A/mm
*[2] Value at a temperature of 300° K As apparent from Table 1, the magnetic recording medium of Example 1 exhibited an Hc of 7.8 kOe (about 621 A/mm), whereas the magnetic recording medium of Comparative Example 2, which has the magnetic recording layer consisting of the first magnetic recording layer 41 only, exhibited an Hc of 15.3 kOe (about 1220 A/mm). The magnetic recording medium of Example 1 has the lower Hc by about 50% than the magnetic recording medium of Comparative Example 2. On the other hand, reduction in β of the magnetic recording medium of Example 1 was approximately 15% as compared to the magnetic recording medium of Comparative Example 2. In view of these results, it is understood that both of excellent writing capability and high thermal stability of the recorded signals are achieved in the magnetic recording medium of Example 1.

Further, in the magnetic recording media which comprise only the first magnetic recording layer 41 comprising the binary ordered alloy, the magnetic recording medium of Comparative Example 1, in which the variation range in the substrate temperature was enlarged to a range from 500° C. to 300° C., exhibited a clearly high Hc as compared to Example 1, although the magnetic recording medium of Comparative Example 1 exhibited a comparable β with Example 1. It is considered that this result is due to deterioration of continuity of the variation of Ku in the thickness direction across a boundary at a temperature of about 350° C., which is caused by a sudden transition from the $L1_0$ ordered phase to the A1 unordered phase of the FePt alloy in a temperature range from 300° C. to 350° C. On the other hand, it is considered that an ideal distribution of Ku is achieved in Example 1, since the final substrate temperature during formation of the first magnetic layer 41 is 370° C., and therefore transition from the $L1_0$ ordered phase to the A1 unordered phase of the FePt alloy does not occur.

Further, the magnetic recording medium of Comparative Example 3, in which both of the substrate temperatures during formation of the first magnetic recording layer 41 and the second magnetic recording layer 42 have been fixed, is a magnetic recording medium having a conventional hard/soft stacking structure. The magnetic recording medium of Example 1 had a smaller Hc by about 33% than the magnetic recording medium of Comparative Example 3, although reduction in β by about 7% was confirmed. Also in view of these results, it is understood that both of excellent writing capability and high thermal stability of the recorded signals are achieved in the magnetic recording medium of Example 1, as compared with the conventional magnetic recording medium.

REFERENCE SIGNS LIST

10 Non-magnetic substrate
20 Soft-magnetic under layer
30 Seed layer
40 Magnetic recording layer
   41 First magnetic recording layer
   42 Second magnetic recording layer
50 Protective layer
60 Liquid lubricant layer

The invention claimed is:

1. A process for producing a magnetic recording medium comprising a non-magnetic substrate, a first magnetic recording layer comprising an ordered alloy, and a second magnetic recording layer comprising an ordered alloy, the process comprising the steps of:
   (A) forming the first magnetic recording layer while monotonously changing a substrate temperature; and
   (B) forming the second magnetic recording layer while monotonously changing the substrate temperature wherein material of the second magnetic recording layer is different from material of the first recording layer,
   wherein the substrate temperature at beginning of the step (B) is set such that magnetic anisotropy constant of the first magnetic recording layer and magnetic anisotropy constant of the second magnetic recording layer is changed monotonously at interface between the first and the second magnetic recording layers.

2. The process for producing the magnetic recording medium according to claim 1, wherein the first magnetic recording layer comprises a binary ordered alloy consisting of Fe and Pt, and the second magnetic recording layer comprises a ternary-or-higher ordered alloy consisting of Fe, Pt, and one or more additional elements.

3. The process for producing the magnetic recording medium according to claim 2, wherein the substrate temperature decreases monotonously during the step (A).

4. The process for producing the magnetic recording medium according to claim 3, wherein the substrate temperature at the end of the step (A) is not less than the highest temperature of a temperature range in which the phase transition between unordered and ordered phases of the binary ordered alloy occurs.

5. The process for producing the magnetic recording medium according to claim 4, wherein the substrate temperature at the end of the step (A) is higher by not less than 20° C. than the highest temperature of the temperature range in which the phase transition between unordered and ordered phases of the binary ordered alloy occurs.

6. The process for producing the magnetic recording medium according to claim 1, wherein the substrate temperature decreases monotonously during the step (B).

7. The process for producing the magnetic recording medium according to claim 1, wherein the substrate temperature at beginning of the step (B) is set such that a difference between the magnetic anisotropy constants of the first and the second magnetic recording layers is within a range of ±3% at the interface between the first and second magnetic recording layers.

8. The process for producing the magnetic recording medium according to claim 1, wherein each of the first and the second magnetic recording layers further comprises a non-magnetic grain boundary material.

9. The process for producing the magnetic recording medium according to claim 8, wherein the non-magnetic grain boundary material comprises at least one material selected from the group consisting of C, B, Ag, Ge, W, $SiO_2$, $Al_2O_3$, $TiO_2$, $GeO_2$ and $B_2O_3$.

* * * * *